Figure 1:
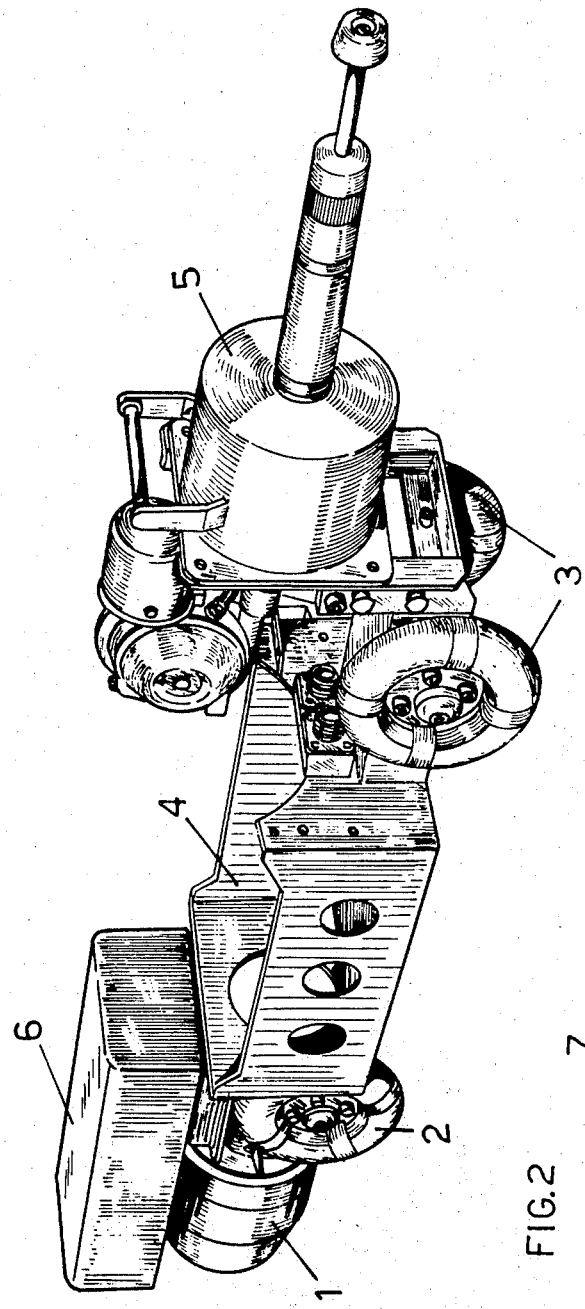

United States Patent [19]
Gambini

[11] 3,872,940
[45] Mar. 25, 1975

[54] SELF PROPELLED SELF-ADJUSTING CARRIAGE ABLE TO MOVE ALONG CURVED PROFILES AS PIPELINES

[75] Inventor: Arnaldo Gambini, San Donato Milanese, Italy

[73] Assignee: Snam Progetti, S.p.A., Milan, Italy

[22] Filed: May 12, 1972

[21] Appl. No.: 252,765

[30] Foreign Application Priority Data
May 13, 1971 Italy .................................. 24463/71
May 13, 1971 Italy .................................. 24464/71

[52] U.S. Cl. .................................. 180/9.5, 305/52
[51] Int. Cl. .................................. B62d 55/08
[58] Field of Search .................... 305/52; 301/5 P

[56] References Cited
UNITED STATES PATENTS
1,305,535  6/1919  Grabowiecki ........................ 301/5 P
1,976,068  10/1934  Higbee ........................... 301/36 WP
2,751,259  6/1956  Bonmartini ...................... 305/52 X
3,533,482  10/1970  Cushman ....................... 180/9.5 X
3,789,947  2/1974  Blumrich .......................... 301/5 P FOREIGN PATENTS OR APPLICATIONS
550,145  5/1932  Germany ............................ 180/9.5
604,009  10/1934  Germany ............................ 180/9.5

Primary Examiner—Philip Goodman
Attorney, Agent, or Firm—Ralph M. Watson

[57] ABSTRACT

The present invention relates to a self-adjusting carriage device which is able to move along curved profile paths such as pipelines and the like, effecting various operations including the inspection, cleaning and varnishing of a pipe, and comprising a self-adjusting guide system, and thereby always able to maintain a rectilinear path along a pipeline or other curved profile path.

4 Claims, 4 Drawing Figures

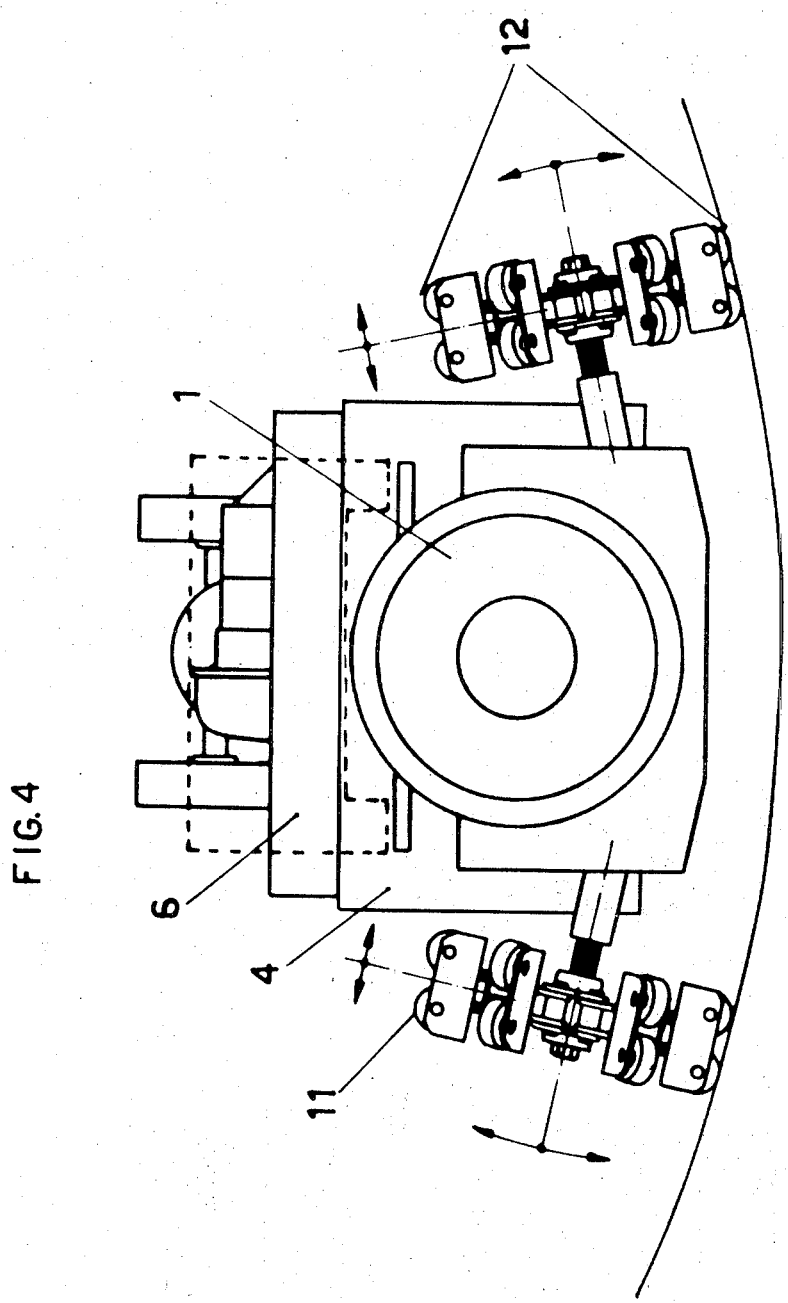

SELF PROPELLED SELF-ADJUSTING CARRIAGE ABLE TO MOVE ALONG CURVED PROFILES AS PIPELINES

This invention relates to a structure able to move along paths with a curved profile such as pipelines and the like and able to effect various operations including the inspection, cleaning and varnishing of the pipe.

A particular object of the present invention is the provision of a self-propelled carriage apparatus adapter to move along a pipeline, insecting the welds, joints and sealing of the pipeline for defects. This inspection is carried out through the present invention by means of a radiant source (i.e., gammaradiography using a gamma ray source). The inspection of the pipeline joints, welds and sealing can be carried out with the radiant source either outside or inside the pipe.

In the first case, when the inspection of the welds, joints or sealing is effected with the radiant source outside the pipe, the radiography requires successive exposures with long exposure times. As a result there is a danger that the operator will be irradiated. More advantageous results are obtained in the second case, in which the radiant source is placed inside the pipe and positioned in such a way that the source irradiates the whole weld, joint or sealing; in this case, the film is placed on the outside of the pipe. Various types of carriage mechanisms used for the inspection of pipe and which involve the introduction of a radiant source into piping are known in the prior art. The simplest of these consists of a self-propelled carriage fed by a cable. This type of mechanism is only able to move along a pipeline for a relatively short distance. More sophisticated mechanisms are powered by batteries; these are able to inspect pipelines of much greater lengths. In most of these prior art inspection systems, the self-propelled carriage and the radiation source are positioned under a weld or joint in a pipe in the following manner. A mechanical feeling device slides along the inside wall of the pipe. When the feeler detects a rough weld or joint, the carriage automatically stops, and the radiography of the weld or joint begins. In more complicated electronic prior art systems, weak gamma ray sources are placed on the outside of the pipe at prefixed distances from the joints or welds to be examined.

The principal disadvantages of these prior art system relate to the automatic driving system of the carriage.

One type of prior art carriage consists of three wheels, one of which is a forward (front) directional wheel, and the rear two of which are for motive power. The stability of the carriage is effected by means of a pendulum device which acts through gearing on the front directional wheel and, from time to time controls the position of the front directional wheel.

In this type of system the forward and reverse wheels have different radii. This is a serious drawback since it may result in the carriage being turned over, particularly in a section of tortuous piping. In addition, it is impossible for such a carriage to operate in both the forward and backward directions unless prior adjustments are made.

Moreover this type of system has the noticeable drawback of not being stable on the bottom of the pipe, particularly in the case in which the carriage driving wheel rests on a portion of pipe which is more nearly a flat plane than a circumferential arch. In this case the carriage swings around to the horizontal position.

Another system overcomes many of the problems of the prior art previously discussed and provides reliable self-adjustment of the carriage not attainable in the prior art. This system controls the position of the carriage with respect to the horizontal plane by means of levers which act on the two front directional wheels. However, this system also has some drawbacks. The carriage in this system has six wheels. This makes both forward and reverse movement possible without adjustment prior to the shifting of direction; but it also involves very complex mechanics. The system consists of three independent driving wheels, a pendulum subsystem which maintains the detector positioned upwards, and electro-mechanical rotating devices. There is also a serious problem in that the driving wheels are not uniformly charged; therefore, they have to be elastic in construction in order to absorb the ovalizations of the canalization and to allow only a minimum amount of adhesion when one or more of the driving wheels are on the upper parts. These difficulties are similar, in so far as wear, resistance and self propulsion of the carriage are concerned, to those that would be encountered with a much heavier carriage.

All these drawbacks of the self-propelled carriages are eliminated by the present invention which supplies an apparatus for introducing radiant sources inside the pipelines, which has no oscillations of any type and requires no elastic assembly of the wheels.

The apparatus consists of a bearing body, in the back part of which are assembled two driving wheels controlled by a geared motor fed with direct current. The wheels are made self-adjusting by means of a series of tired rollers mounted on bearings and set on the periphery of the wheel rims. Frontally are mounted two other wheels which may be used to drive the carriage by means of transmission either by means of a chain or belt (see FIG. 3), or independently (see FIG. 1).

Each wheel on one side of the carriage may be connected to another wheel on the opposite side of the carriage. These connected pairs of wheels rotate together.

In the case in which the front wheels are used to drive the carriage, e.g., when inspecting pipelines of considerable slope, the four wheels of the carriage remain rigidly paired between them if the motion of the wheels is realized by means of transmission, whereas they are not rigidly paired if they are driven by independent motors.

In FIG. 1 is shown, by a way of example, a general view of a self-propelled carriage according to the invention.

The carriage is guided by means of the said self-adjusting wheels which allow the carriage to have the same turning radius to both direction of movement. In addition, in the present invention, any wheel may have a radius as small as the pitch of the carriage will permit. The type of wheel utilized in this invention is shown in FIG. 2.

Figure 2:
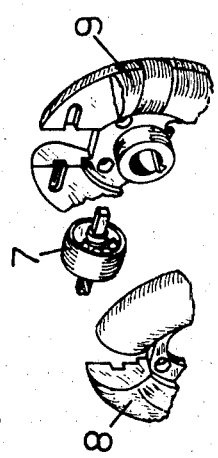

With reference to the FIGS. 1 and 2:

1—shows the geared motor group
2—shows the self-adjusting driving wheels
3—shows the self-adjusting directional wheels
4—shows the body or bearing or structure
5 and 6 show respectively the head isotope holder, used only in the case in which the device is used to effect radiographic researches, and a container of electronic devices; 7 shows zones (or rollers) able to revolve around an axis orthogonal or nearly orthogonal to the rotational axes of the wheels; (8 and 9) show sections of the wheel. The device of the invention consists of a body able to support and to transfer practically any material. As mentioned above, such material may include various sorts of equipment, e.g., equipments to effect research by means of radiation of the piping along which the device moves and equipment necessary for the inspecting, cleaning and varnishing and other treatments of the piping.

The device of the present invention also has means by which it is able to operate its previously described wheels, and moreover it has means by which it is able to change directions of movement.

Finally the device of the invention can be adapted for many purposes.

The device of the present invention is made to follow a curved pipeline path, holding a given position.

Each wheel is provided with zones or rollers (item (7) in FIG. 1), which are free to rotate under the action of gravity around axes orthogonal or nearly orthogonal to the rotational axis of the wheel.

The wheels allow for automatic forward and backward movement without need for adjustment by any external means. The zones (rollers) are free to rotate about axes orthogonal or nearly orthogonal to the rotational axes of the wheels; this results in translations which because of gravity cause the self-adjustment of the device.

The wheels of the invention can be made of any material or combination of materials that is appropriate to the particular task for which the invention is to be used (e.g., for certain tasks it may be desirable to have wheels that are highly adhesive).

One embodiment of the present invention includes metallic wheels covered with rubber; a series of rollers are inserted in the periphery of each wheel, but these rollers do not overhang the wheel (see FIG. 1 — items (2) and (3) and FIG. 2 — item (7)); the metallic rollers are assembled on bearings and are covered with rubber.

As previously stated, the rollers are free to rotate around axes that are orthogonal or nearly orthogonal to the rotational axes of the wheels; this prevents the wheel from diverting from a rectilinear path. The embodiment of the present invention herein disclosed has wheels each of which has inserted into it, four rollers arranged symmetrically with 90° between each roller (see FIG. 1 — item (3)); of course, the number of rollers may be increased or decreased at will, depending on the dimensions of the rollers.

The rollers also may be arranged so as to overhang the wheel. In such an embodiment an adjustment system allows the roller to lean periodically on the sliding surface; the wheel is lifted in this manner.

However, this type of system results in greater expense. Such a system has to be adjusted for every diameter of the pipe. In addition, in such a system, the carriage is jolted every time the roller supports (or lifts) the wheel. In the first embodiment discussed, the profile of each wheel remains perfectly uniform because the outer circumference of the rollers conform with the circumference of the rest of the wheel; therefore, there is no interference with the slope and continuity of the treads and the carriage moves more easily and is not jolted. The working principle of the self-adjusting system is the following: The wheels of the present invention are paired on shafts, i.e., two wheels on each shaft, so that the rollers inserted into a wheel are in phase with those inserted in the wheel at the opposite end of the shaft.

The wheels periodically lean on said rollers. In those instances the wheels have two degrees of freedom which sum to the one of rolling.

Therefore the front wheels rotating in the motion direction become periodically free to shift axially, when the system is stressed by perturbing forces normal to the motion.

The driving wheels act similarly being rigidly paired on a separate propeller shaft. The forces which impress the translation motion to the wheels and consequently to the carriage when it moves from a horizontal line and begins to climb the pipe wall are proportional to the weight of the carriage. Therefore, each time the moving carriage tends to stray from a horizontal line, a force is engendered which acts on the wheels and effects a translation which brings the carriage back to the bottom of the pipe.

Therefore, the wheels rotate in the direction of motion of the carriage, but also due to the action of the rollers, may be moved orthogonally to this direction of rotational motion.

The frequency of translation intervention for each turn of the wheel is determined only by the number of rollers housed on the wheel, the greater the number of rollers, the greater the wheel's ability to adjust itself.

Using this system the carriage of the present invention may move in both forward and backward directions along pipeline of any degree of bending and rectilinear stretches of pipeline as well, always maintaining rectilinear motion and without jolts or oscillations. This is due to the fact that, the carriage is supported by four wheels which do not lean on the bottom of the pipe, but on the two inclined walls of the pipe. Thus, the translational forces acting on the system are amplified. In fact, as a result of the four wheels of the carriage leaning on the curved walls of the pipeline, a relatively small deviation of the carriage from the horizontal position creates a significant translational force which brings the carriage back into equilibrium. Moreover in this system with four wheels, none of the wheels move along the bottom of the pipe; all four wheels move along the walls of the pipeline. This greatly reduces the possibility that the carriage will be stopped by foreign matter on the pipe. The wheels may be constructed using any technique, e.g., a sector typpe construction or multicomponent parts type construction, etc. However, it is important that in assembling the wheels that the rollers of the wheels be in phase with one another.

The number of rollers is not critical but the more rollers that are present the greater the carriage's self-adjustment ability. The number of rollers, within certain limits, is also a function of their dimensions; the larger the length of the roller the less rollers that are needed.

Both the length and the number of the rollers may be function of the speed to which the carriage must work.

A particular self-adjusting carriage has been described which is moved by means of wheels, each of which is equipped with zones (or rollers) which are able to rotate around axes orthogonal or nearly orthogonal to the axes of rotation of the wheels; this structure enables the carriage to adjust itself, whereby it always maintains a rectilinear path. The same principle is used for a carriage which is moved by means of one or more tracks. In this case, the tracks have zones (or rollers)

which rotate around the axes orthogonal to the rotation axis of the track or of the tracks.

The zones or rollers can also be oriented so as to rotate in a direction orthogonal to that of the track around fulcrums on mountings which support the track.

Figure 3:
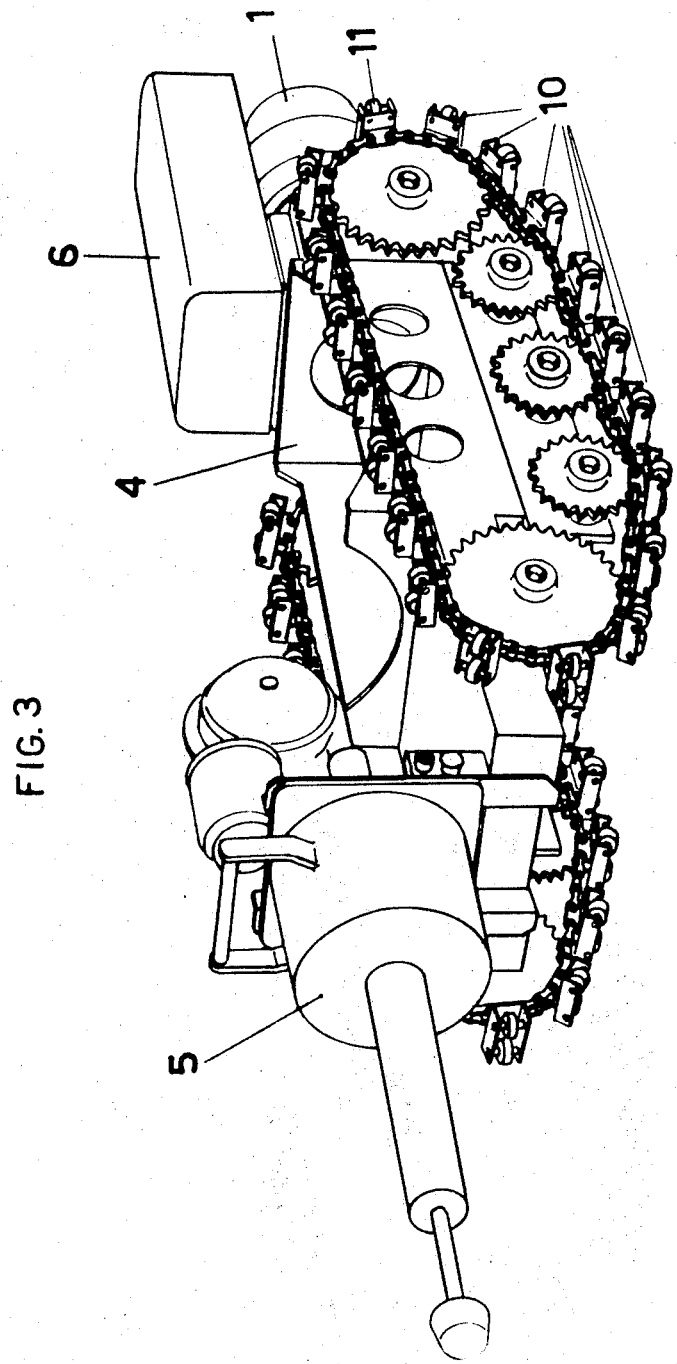

The invention will be better illustrated with reference to the FIGS. 3 and 4:

10) represents the track which may be of any type
11) represents the self-adjusting roller.
12) represents a track of the orientable type.

The other parts of the device are numbered as in FIGS. 1 and 2. Practically the device of the invention comprises a body or generally a structure able to support and transfer any material as above described.

Besides the body, the device which realizes movement by means of tracks also has means able to operate such tracks and moreover means able to change the direction along the path of march.

The movement may also be reversed.

The tracked system is less economical to make than the wheeled system, however it offers greater capability; it is able to climb steep slopes and in some cases may be able to climb almost straight up by mounting one or more wheels elastically on the upper parts. Furthermore, the tracked system can overcome larger obstacles on a pipeline. The present invention has been illustrated and described with reference to certain embodiments, but it is understood that these have been described only by way of example, the invention being defined by the following claims:

I claim:

1. A self-propelled self-adjusting carriage able to move along curves profiles, such as pipelines, said carriage comprising:
    i. a bearing body;
    ii. means to propel said carriage;
    iii. a self-adjusting guide system on said bearing body whereby self-adjustment is achieved by gravity, said self-adjusting guide system comprising wheels, said wheels provided with peripheral rollers mounted for free rotation around axes substantially orthogonal to the axes of rotation of said wheels so that said rollers are located between the sides of the wheels.

2. A carriage as defined in claim 1 wherein said wheels are paired and said rollers are in phase.

3. A carriage as defined in claim 1 wherein said wheels and rollers comprise the same material selected from metals, metal alloys, elastomers, and synthetic elastomeric-like substances.

4. A carriage as defined in claim 1 wherein said wheels and rollers comprise different materials selected from metals, metal alloys, elastomers, and synthetic elastomeric-like substances.

* * * * *

UNITED STATES PATENT OFFICE
CERTIFICATE OF CORRECTION

Patent No. 3,872,940      Dated March 25, 1975

Inventor(s) Arnaldo Gambini

It is certified that error appears in the above-identified patent and that said Letters Patent are hereby corrected as shown below:

Column 1, line 11, "insecting" should read -- inspecting --;

Column 2, line 53, "direction" should read -- directions --;

Column 4, line 47, "typpe" should read -- type --;

Column 6, line 6, "curves" should read -- curved --.

Signed and sealed this 27th day of May 1975.

(SEAL)
Attest:

RUTH C. MASON
Attesting Officer

C. MARSHALL DANN
Commissioner of Patents
and Trademarks